May 7, 1935.  A. H. BOMBERGER  2,000,818
COMBINED SALT AND PEPPER SHAKER
Filed July 21, 1934
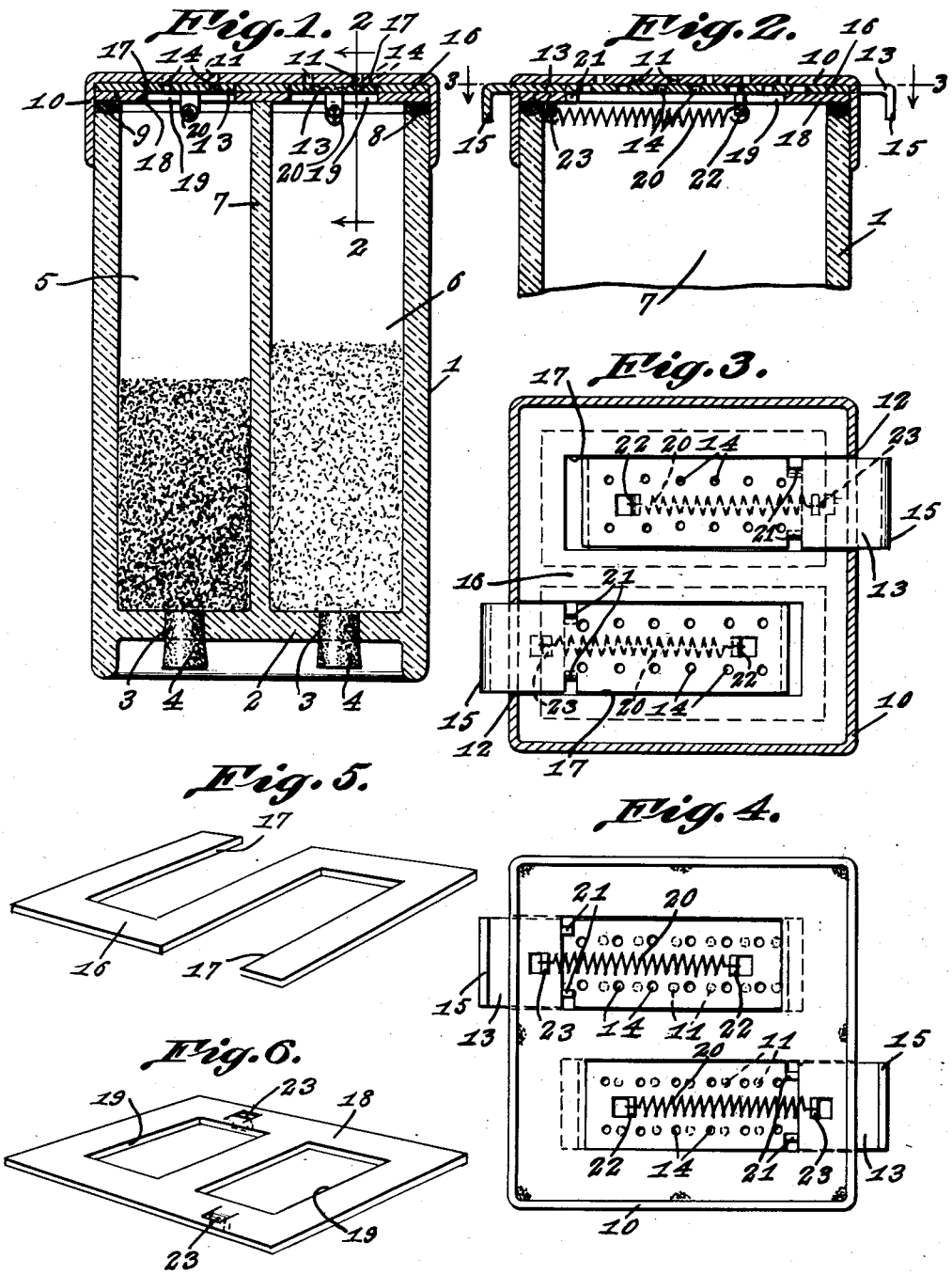
Allen H. Bomberger, INVENTOR
BY Victor J. Evans & Co.
ATTORNEY Patented May 7, 1935

2,000,818

UNITED STATES PATENT OFFICE 2,000,818

COMBINED SALT AND PEPPER SHAKER

Allen H. Bomberger, Ephrata, Pa.

Application July 21, 1934, Serial No. 736,429

1 Claim. (Cl. 65—45)

This invention relates to a combination salt and pepper shaker and has for the primary object the provision of a device of the above stated character which will provide in a single unit mediums for salt and pepper keeping said ingredients entirely separate from one another and having means whereby either of said ingredients may be easily and quickly dispensed in desired amounts so that a person may conveniently season foods and the like.

With these and other objects in view this invention consists in certain novel features of construction, combination and arrangement of parts to be hereinafter more fully described and claimed.

For a complete understanding of my invention, reference is to be had to the following description and accompanying drawing, in which Figure 1 is a vertical sectional view illustrating a salt and pepper shaker constructed in accordance with my invention.

Figure 2 is a sectional view taken on the line 2—2 of Figure 1.

Figure 3 is a sectional view taken on the line 3—3 of Figure 2.

Figure 4 is a bottom plan view illustrating the cover for the container.

Figure 5 is a perspective view illustrating a guide plate mounted in the cover of the container for the slides.

Figure 6 is a similar view illustrating a retaining plate.

Referring in detail to the drawing, the numeral 1 indicates a container, the bottom wall 2 of which is spaced a distance from the lower edge of the container and is provided with spaced openings 3 normally closed by a removable plug 4. The openings provide means for permitting compartments 5 and 6 to be filled with pepper and salt. The compartments 5 and 6 are formed in the container 1 by a partition 7 which extends from the bottom wall 2 to the upper open end of the container. The upper edges of the container are grooved, as shown at 8, to receive a gasket 9. A flanged cover 10 closes the upper open end of the container and engages with the gasket to close the compartments. The top wall of the cover is provided with groups of perforations 11 aligning with the compartments 5 and 6 and opposite flanges of the cover are slotted, as shown at 12, to slidably receive slides 13 provided with perforations 14 to be moved into and out of registration with the perforations 11. The outer ends of the slides are disposed angularly to form finger pieces 15. A guide plate 16 is located in the cover 10 and has slots 17 opening outwardly through opposite edges to receive the slides 13. The slots 17 form the guide plates 16 into substantially S-shape. The thickness of the guide plate 16 is slightly greater than the thickness of the slides so as to efficiently guide the movement of said slides. A retaining plate 18 is positioned onto the guide plate and has slots 19 aligning with the slots 17 thereby permitting the salt and pepper in the compartments 5 and 6 to pass through the perforations of the slides and cover when said perforations are aligned. The slides carry lugs 21 and 22 which project into the slots 19 and are for the purpose of limiting the inward and outward movement of the slides. Coiled springs 20 are connected to lugs 23 on the plate 18 and to the lugs 22 and act to urge the slides outwardly positioning the perforations over said slides out of registration with the perforations of the cover. A pressure upon the finger pieces of the slides by a person will bring said slides to align the perforations thereof with the perforations of the cover so that the salt and pepper may be dispensed from the compartments in the usual way.

After the plates 16 and 18 have been assembled with the slides in the cover, the plate 18 is soldered or otherwise secured to the flanges of the cover.

Having described the invention, I claim:

A salt and pepper shaker comprising a container having compartments, a flanged cover for said container and provided with groups of perforations with each group aligning with a compartment, said cover having slots in opposite sides of its flanged portion, perforated slides operating through the slots and normally positioned to close the perforations of the cover and adapted to open the perforations of the cover by manual manipulation, a plate mounted in the cover and having slots opening through opposite edges thereof to slidably receive the slides, a retaining plate engaging the first plate and having slots and underlying the slides with portions of the latter exposed to the compartments by way of the last-named slots, and springs connected to said retaining plate and the slides.

ALLEN H. BOMBERGER.